Dec. 14, 1937.  C. W. BERTHIEZ  2,102,505
MACHINE FOR THE TOOLING OF METALLIC SCREW PROPELLER BLADES
Filed March 26, 1937  2 Sheets-Sheet 1
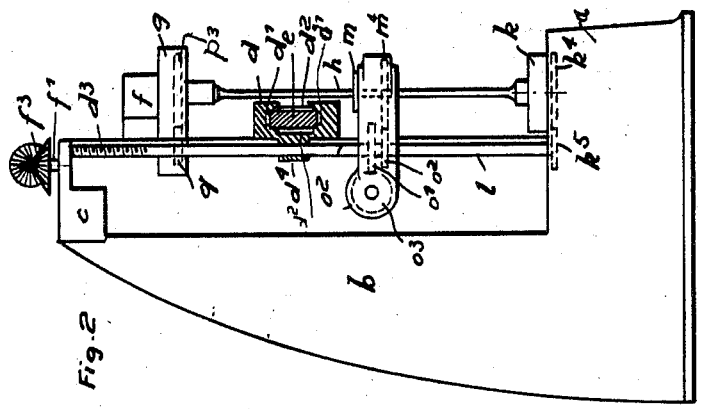
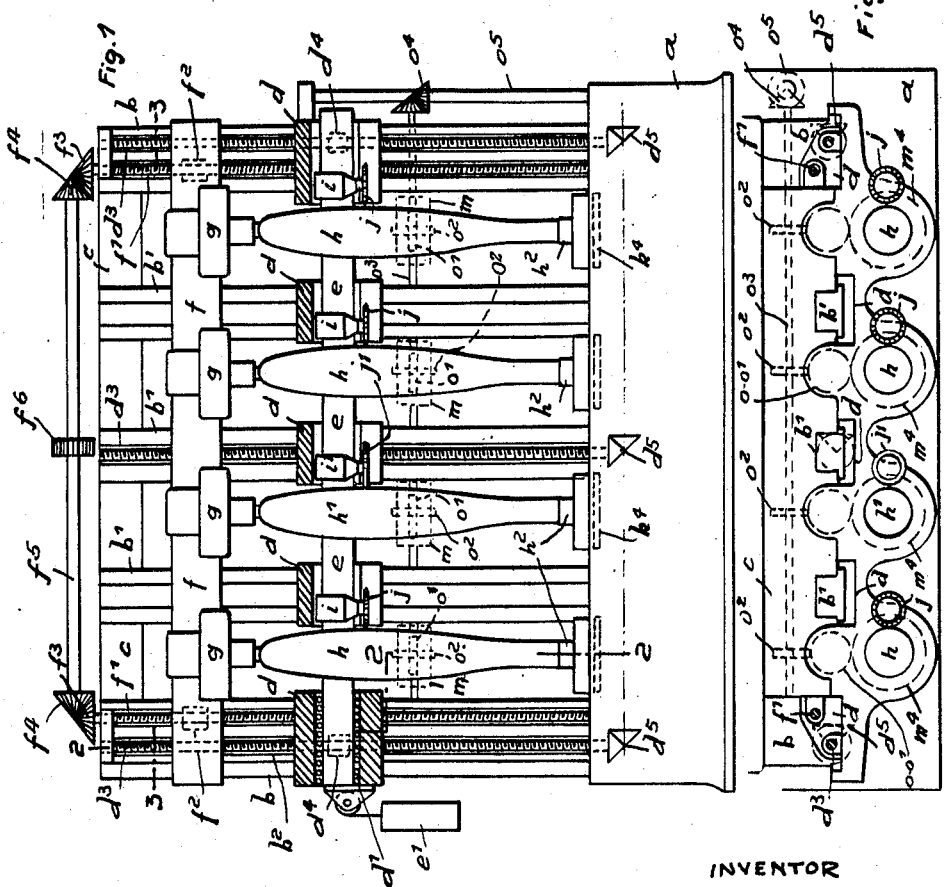
INVENTOR
CHARLES W. BERTHIEZ
by his attorneys
Howson and Howson Dec. 14, 1937.     C. W. BERTHIEZ     2,102,505
MACHINE FOR THE TOOLING OF METALLIC SCREW PROPELLER BLADES
Filed March 26, 1937     2 Sheets-Sheet 2
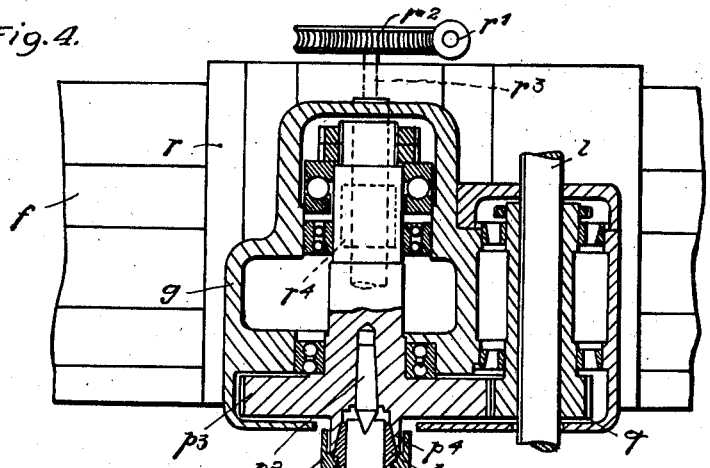
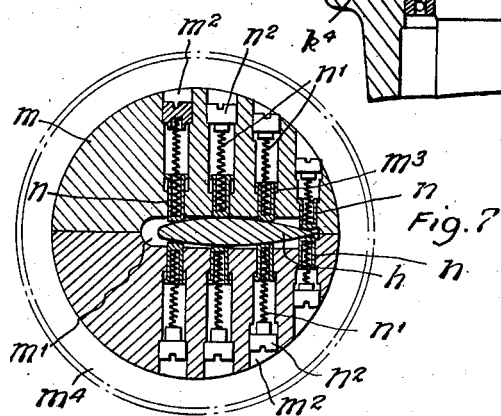
INVENTOR
CHARLES W. BERTHIEZ
by his attorneys
Howson and Howson Patented Dec. 14, 1937

2,102,505

UNITED STATES PATENT OFFICE 2,102,505

MACHINE FOR THE TOOLING OF METALLIC SCREW PROPELLER BLADES

Charles William Berthiez, Paris, France, assignor to "Compagnie de Fives-Lille", Paris, France, a corporation of France Application March 26, 1937, Serial No. 133,257
In France April 2, 1936

2 Claims. (Cl. 90—136)

The present invention relates to machines employed for the tooling or machining of metallic screw propeller blades, by means of milling cutters or like tools, according to a blade serving as pattern, in which machines the pattern to be reproduced and the parts to be machined receive synchronized movements of rotation around parallel axes and the tools receive displacements, corresponding to those of the feeler in contact with the pattern to be reproduced, perpendicular to those axes of rotation of the blades and pattern.

In machines of this kind employed hitherto, the blades to be tooled are placed in a horizontal position; this gives rise to deformations of the blade to be machined, which vary with its angular position; on the other hand, these blades are subjected to torsional forces, the blades being driven in their movement of rotation only at one end of their extremities.

According to the invention, the blades to be machined are arranged with their neutral axis in a vertical position, are placed under axial tension during the machining and are driven in their movement of rotation at both their extremities.

By placing the blades under an axial tension, that is to say in the vertical direction, an abnormal tensional force during machining is suppressed and all bending is eliminated; on the other hand, the simultaneous rotary driving at the two extremities obviates the torsion of the blades and allows a rational machining of them.

There can moreover be provided, at an intermediate point in the length of each of the blades, a guiding ring of which the movement is likewise driven, which allows the centering and the driving of this blade at that point, in addition to the driving at the two extremities, in synchronism with the latter; in this way the forces of flexion and torsion are still further reduced.

The invention is described hereafter in a detailed manner with reference to the accompanying drawings, which represent one example of carrying it into operation:

Fig. 1 is a view more or less diagrammatic in front elevation of the machine, parts in vertical section;

Fig. 2 is a view in vertical section thereof along the broken line 2—2 of Fig. 1;

Fig. 3 is a view in horizontal section along the line 3—3 of Fig. 1;

Figs. 4, 5, and 6 are views in axial vertical section through the upper and lower driving mechanisms of a screw propeller blade and through the intermediate driving and centering rings, respectively; and Fig. 7 is a view in horizontal section on a larger scale through the guiding ring, along the line 7—7 of Fig. 6.

Upon the base $a$ of the machine are fixed two end uprights $b$ connected together by horizontal cross members $c$, upon which are fitted intermediate uprights $b^1$; the uprights $b$ and $b^1$ comprise on their front vertical face, vertical slides $b^2$ along which can travel carriages $d$, supporting a horizontal cross member $e$; the latter is mounted upon the carriages $d$ by means of a series of rollers having horizontal and vertical axes respectively $d^1$ $d^2$ (Figs. 1 and 2).

The carriages $d$ and the cross member $e$ can receive a vertical feed movement by the intermediary of screws $d^3$ journaled vertically in the end uprights $b$ and in the central intermediate upright $b^1$, which engage with a part $d^4$ forming a nut upon the rear face of the corresponding carriage $d$ (Fig. 2); the screws $d^3$ are actuated by bevel pinions at $d^5$ driven from the change speed box (not represented), located in the base of the machine.

Upon the vertical slideways of the uprights $b$ $b^1$ there can likewise slide another horizontal cross member $f$; the latter can be raised or lowered by means of screws $f^1$, journaled vertically in the end uprights $b$ and engaged with parts $f^2$ forming nuts upon the rear face of the cross member $f$; these screws $f^1$ are likewise actuated by bevel pinions $f^3$, meshing with bevel pinions $f^4$, secured to a cross shaft $f^5$; this shaft $f^5$ may be rotated through a chain (not shown) engaging a sprocket wheel $f^6$, secured to said shaft $f^5$, or in any other suitable manner. The upper cross member $f$ carries movable head stocks $g$, serving for the driving of the screw propeller blades $h$ at their upper extremity as will be described hereafter.

Upon the cross member $e$ are mounted the head stocks $i$ carrying the milling cutters $j$ having vertical axes, serving for the machining of the blades $h$, as well as the head stock $i^1$, likewise having a vertical axis, carrying the copying roller $j^1$ which comes in contact with the screw propeller blade $h^1$ serving as the pattern to be reproduced by machining of the other blades $h$.

The milling cutters $j$ and the copying roller $j^1$ are constantly maintained in contact with corresponding screw propeller blades $h$ $h^1$, by the action of a counterweight $e^1$, suspended from a cable attached to the cross member $e$ having a horizontal sliding movement in the carriages $d$.

Each of the propeller blades $h$ $h^1$ is driven at its lower extremity from the following device (Fig. 5); the lower trunnion $h^2$ of each blade is clamped by locking dogs $k^1$ to a plate $k$ (these dogs being fixed in the customary manner by bolts $k^2$ to grooves $k^3$ of inverted T-shape starting from the upper face and from the periphery of the plate $k$); this plate $k$ is in its turn fastened by dowels to a gear $k^4$ meshing with a spur toothed pinion $k^5$ keyed upon a vertical driving shaft $l$, which extends over the whole height of each blade, as far as the movable head stock at the upper extremity of the latter.

Each propeller blade is likewise centred and driven at an intermediate point of its length by the following device (Figs. 6 and 7): the blade $h$ is surrounded by a ring $m$ formed in two halves connected together and leaving between them a gap $m^1$ into which the blade passes; on the two sides of the blade there act plungers $n$ opposed in pairs; each plunger $n$ is subject to the action of a spring $n^1$, bearing upon a screw $n^2$, adjustable in position in a recess $m^2$ in one of the halves of the ring $m$ (Fig. 7); a shoulder $m^3$ limits the stroke of the plungers $n$ towards the blade.

Around the ring $m$ is keyed a spur toothed crown $m^4$, meshing with a pinion $o$, keyed upon the vertical shaft $l$ and fast with a helicoidal wheel $o^1$; the latter is in mesh with a helicoidal wheel $o^2$ fixed upon a horizontal shaft $o^3$, extending across and over the whole width of the machine, behind the propeller blades $h$ $h^1$; this shaft $o^3$ is itself driven by bevel pinions $o^4$ by a vertical shaft $o^5$ receiving its movement from the gear box (not represented), located in the base $a$ of the machine.

The ring can be of fixed position in height or can receive a feed movement downwards, at the same time as the cross member $e$ with the tool-holders $i$ $i^1$, by a screw and nut mechanism (not represented).

Each propeller blade $h$ $h^1$ is driven at its upper extremity by the following device (see in particular Fig. 4): the upper trunnion $h^3$ of the blade is clamped in a split conical mandril $p$ by a screw threaded ring $p^1$ forming a nut; the trunnion is centred by a point $p^2$ in the driving plate $p^3$, comprising on its lower face a socket $p^4$, in which the mandril $p$ is clamped by the ring $p^1$; this plate $p^3$ meshes with a toothed pinion $q$ keyed upon the vertical shaft $l$, (of which the movement of rotation is driven, as described above, by the transmission $o$ $o^1$ $o^2$ $o^3$ $o^4$ $o^5$). The plate $p^3$ is journaled as also is the pinion $q$, in the head stock $g$, which is mounted upon a slide $r$, upon which it can receive a slight vertical displacement; this is produced by a worm $r^1$, adapted to be actuated by hand and meshing with a helicoidal wheel $r^2$, fast with a vertical screw $r^3$ journaled in the slide and engaging with a nut $r^4$ fast with the head stock $g$. This mechanism allows a precise adjustment of the vertical position of each of the head stocks $g$, according to the length of each blade $h$, after the upper cross member $f$, supporting the different head stocks $g$, has been brought in the manner previously described to the level corresponding approximately to the length of all the blades $h$ $h^1$. In this way each of the blades can be put under a suitable axial tension, in such a way as to suppress the forces of flexion during machining. The upper driving plate $p^3$, as well as the pinion $q$ are journaled in the head stock $g$ by the intermediary of ball thrusts and bearings, in order to absorb the tension exerted upon the blade.

What I claim is:

1. A machine for the tooling of metallic screw propeller blades according to a blade serving as a pattern, comprising a blade pattern and a set of blade blanks to be tooled arranged with their axis in a vertical position, means for giving to the blade pattern and to the blade blanks synchronous movements of rotation around their parallel vertical axes, a feeler adapted to engage with the blade pattern to be reproduced, a set of cutting tools adapted to engage with the blade blanks to be tooled, means for displacing the feeler along the blade pattern and means for giving to the tools displacements corresponding to those of the feeler, perpendicular to the axes of rotation of the blade blanks and of the blade pattern, means for maintaining said feeler and said tools in engagement with the blade pattern and blade blanks respectively, during said displacements, in combination with means for maintaining each of the blade blanks and the blade pattern under axial tension during tooling, and with means for driving each of the blade blanks and the blade pattern at both ends during its movement of rotation.

2. In a machine as claimed in claim 1, the provision of means for centering and driving each of the blade blanks and the blade pattern at a point intermediate of its length, in synchronism with the means driving each of them at its both ends.

CHARLES WILLIAM BERTHIEZ.